Feb. 6, 1923. 1,444,021
F. ASHWORTH.
STARTING AND STOPPING MECHANISM.
FILED AUG. 18, 1920.

INVENTOR.
Fred Ashworth

Patented Feb. 6, 1923.

1,444,021

UNITED STATES PATENT OFFICE.

FRED ASHWORTH, OF WENHAM, MASSACHUSETTS, ASSIGNOR TO UNITED SHOE MACHINERY CORPORATION, OF PATERSON, NEW JERSEY, A CORPORATION OF NEW JERSEY.

STARTING AND STOPPING MECHANISM.

Application filed August 18, 1920. Serial No. 404,410.

*To all whom it may concern:*

Be it known that I, FRED ASHWORTH, a citizen of the United States, residing at Wenham, in the county of Essex and State of Massachusetts, have invented certain Improvements in Starting and Stopping Mechanism, of which the following description, in connection with the accompanying drawings, is a specification, like reference characters on the drawings indicating like parts in the several figures.

This invention relates to starting and stopping mechanisms. The invention is shown herein as embodied in mechanism of this class which is automatically operative to start and stop the machines in which the mechanisms are embodied.

In prior constructions of a well-known type the relation between the clutch and brake mechanisms is such that the clutch is operated to start the machine while the brake is still applied, the result being that the rotation of the power shaft is retarded due to the operation of the brake. Furthermore, under such conditions deterioration of the parts of both clutch and brake is relatively rapid due to the greater strain on the parts and the increased wear to which they are subjected. In other classes of starting and stopping devices the brake is removed when the starting means is operated to start the machine, connections being provided directly between the brake and the starting mechanism. This construction has the disadvantage of requiring that the operator shall exert sufficient force not only to operate the clutch but to remove the brake, commonly against a spring of considerable strength which is utilized in applying the brake.

It is an object of this invention to provide a starting and stopping mechanism which will be especially simple and compact in construction, efficient in operation, and which will be free from the above mentioned and other disadvantages inherent in prior constructions.

In one aspect the invention resides in a novel organization of brake and clutch devices related to each other through an improved connection and automatically operative to insure that the brake will be released before the clutch becomes effective to apply power to the driven member.

In the illustrative mechanism there is disclosed an improved brake device comprising preferably a wedge member which is automatically operative to insure the application of the brake through unyielding connections. Conveniently the brake device is constructed of parts which are exactly like the corresponding parts of the clutch which is of a markedly efficient type as proven by extensive commercial use. As shown the similarly constructed brake and clutch devices are positioned reversely with respect to each other and so connected that operation of the clutch to connect the driving and driven members is preceded by the automatic release of the brake.

Other features of the invention and other combinations of parts will be described in the detailed specification and pointed out in the appended claims.

Figures 1, 2, 3, 4:
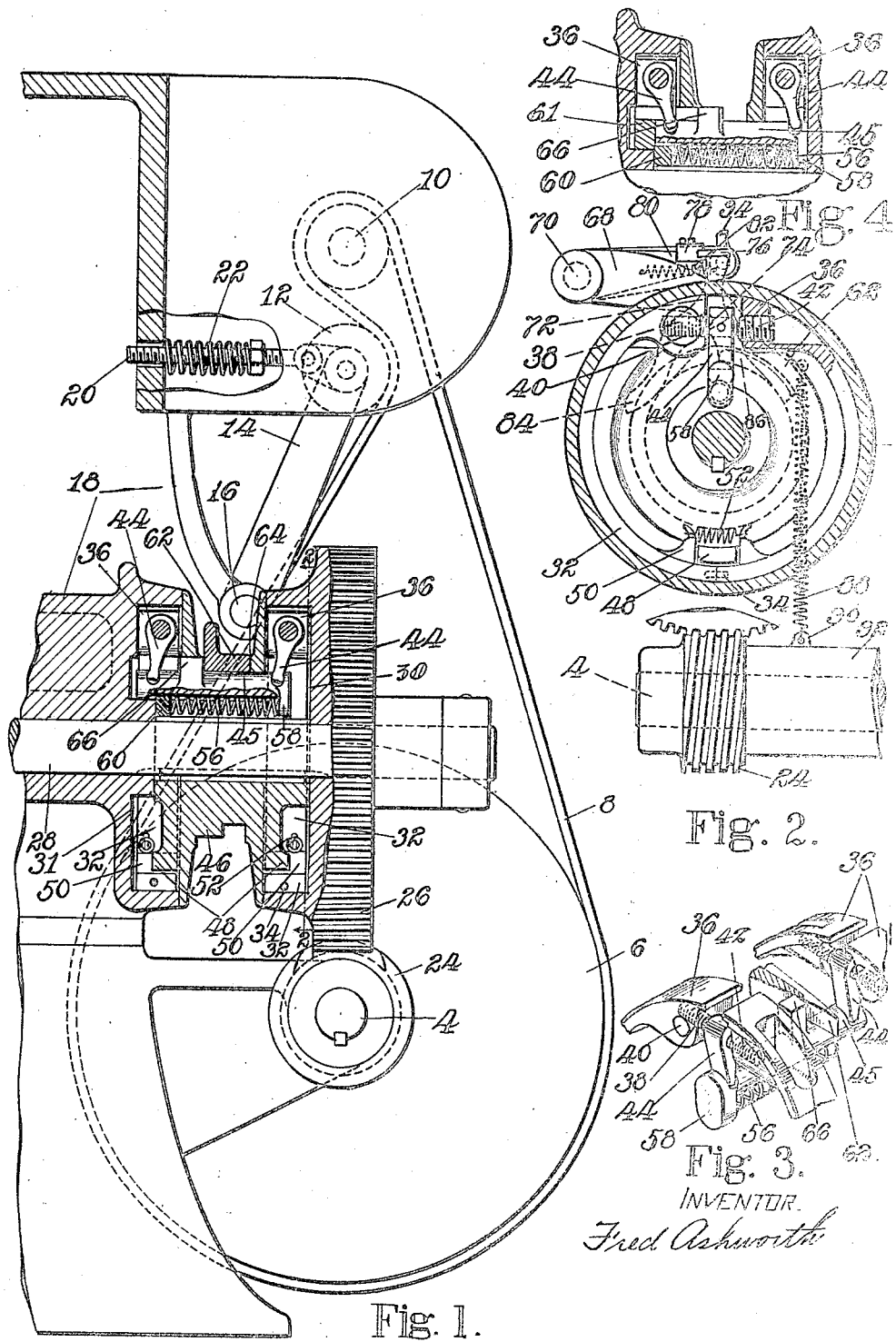
Fig. 1 is a view in side elevation and partly in section of a mechanism showing one illustrative embodiment of the invention.
Fig. 2 is a section along the line 2—2 of Fig. 1 looking in the direction of the arrow.
Fig. 3 is a detailed view of the plunger and of the screw members operated thereby.
Fig. 4 is a detail view showing the clutch operated and the brake released, which is just the opposite condition to that shown in Fig. 1.

In the drawings, there is shown a shaft 4 driven by a pulley 6 keyed thereto, the said pulley being driven from a belt 8 which passes also around a shaft 10 which may be an armature shaft or one driven from any other source of power. As shown, a belt tightening device is provided acting on the belt 8 comprising a roll 12 mounted pivotally at the end of the link 14 supported upon the pivot 16 in the frame 18 of the machine. Connected to the upper end of the link 14 is a bolt 20, and located between a shoulder on the bolt and a surface on the supporting structure is a spring 22 whereby the bolt is urged in a direction to press the roll 12 against the belt 8. Carried by the shaft 4 and fixedly secured thereto is a worm gear 24 which is constantly in mesh with a relatively large gear 26 mounted for free rotation upon a shaft 28 rotatable in bearings in the supporting frame 18. Interposed between the gear 26 and the shaft 28 and between the shaft 28 and the fixed support 18 are the clutch and brake mechanisms illustrative of the invention. It will be understood, however, that the clutch and brake devices may be used together or independently of each other and in other relations than that shown. In other words, the invention relates to clutch and brake mechanisms of general utility in connection with driven and driving members and their supporting structures.

In the illustrative mechanism, the gear wheel 26 is provided with a chamber 30 and the supporting frame 18 with a chamber 31 in each of which is mounted an annular member 32 which is expansible and contractible within the chamber to engage the circular wall thereof. In the preferred form the annular member is a split ring, the lower ends of which abut each other and are connected by a pin or dowel indicated at 34 (Figs. 1 and 2) and the upper ends 36 of which are spaced as indicated in Figs. 2 and 3. Mounted in one of the ends 36 of the split ring is a screw-threaded member 38 threaded into a cylindrical block 40 inserted in an opening bored transversely through the end 36 of the split ring and adapted to turn somewhat in said opening with the member 38 to prevent binding of the parts as the ring is spread apart or contracted. Projecting from the opposed end surface of the other ring end 36 is a block 42 threaded in said end for adjustment therein and providing a bearing for the conical end of the screw threaded member 38. Pinned to the member 38 is an arm 44, the lower end of which is receivable in a slot in one end of a bolt or plunger 45. The adjustment of the screw-threaded member 38 and of the block 42 is such that movement of the arm 44 in one direction from the vertical causes expansion of the annular member or split ring 32 due to separation of the upper ends 36 and movement of the arm 44 in the opposite direction permits movement of the ends 36 toward each other as the ring 32 contracts under its own elasticity. Upon expansion of the ring member 32, the outer surface of the same is brought into firm contact with the circular wall of the chamber in which it is housed, while, on the contrary, contraction of the ring disconnects the same from the surrounding structure.

Keyed to the shaft 28 is a block 46 having projections 48 extending in opposite directions and each located between two abutments 50 integral with or fixedly attached to each annular member 32 and hence, upon rotation of the shaft, the annular members are carried along therewith under all conditions. If the annular member 32 located in chamber 30 has been expanded in the manner described then the shaft 28 will move with the gear wheel 26. If, on the other hand, said annular member is contracted so as to be free of the inner wall of the chamber 30 then the gear wheel 26 rotates independently of the shaft which remains stationary. As shown a spring 52 has its ends attached to projections on the two abutments 50 thereby holding the lower ends of the split ring 32 in abutting relation. Mounted in the block 46 is the plunger 45 having a slot in each end for receiving the lower ends of the arms 44 as above described.

The brake mechanism, in the illustrative construction, comprises parts which operatively connect the shaft to a surface on a fixed part of the stationary frame 18 of the machine in which the shaft 28 is mounted. As illustrated, the stationary part of the frame adjacent to the block 46 on the shaft 28 is provided with the chamber 31 and has mounted therein clutch members which are conveniently of the same structure as those described in connection with the clutch parts located in the chamber within the gear wheel 26. It will be observed, however, that the two annular members or split rings 32 are in reversed relation to each other so that movement of the plunger 45, which is connected to both of the arms 44, in one direction produces directly opposite results, one annular member being expanded to effect clutching engagement with the surrounding member and the other annular ring being contracted to free itself from the surrounding member. In the construction shown the plunger 45 is operated upon by a spring 56 which engages at one of its ends with a head 58 of the plunger and at its other end with an end wall 60 of the socket in the block 46 which houses the said spring, the arrangement being preferably such that the plunger 45 is moved by the spring in the direction to cause a clutching of the gear wheel 26 to the shaft 28 and simultaneously a releasing of the other annular member 32 which was operating as a brake to connect the shaft 28 to the stationary frame portion 18. After the spring moves the plunger 45 to cause a clutching of the wheel 26 to the shaft 28, a cam 61 (Fig. 4) stationary with the frame 18 is engaged by the end of the plunger 45, which is rotating with the shaft, with the result that the plunger is moved positively to the right (Figs. 1 and 4) thus ensuring proper clutching of the driven and driving members 28 and 26 respectively. The stationary cam 61 extends only a relatively short distance around the shaft since the spring 56 is fully operative to hold the clutch parts in engaging relation, it being of a tension normally to move the parts into clutching relation. Hence cam 61 is provided to ensure a firm clutching of the parts under all conditions and especially if an extra heavy load is imposed upon the shaft 28. While the spring 56, through the plunger 45, operates the clutch and brake devices simultaneously, as a practical matter the brake is released before the clutch is set, for the reason that the clutch parts in chamber 31 are moving away from the point of greatest expansion while the clutch parts in chamber 30 are moving away from the point of greatest contraction. Preferably, the plunger 45 is moved positively in the opposite direction by means of a wedge or cam member 62 which engages slidably with a surface 64 (on the block 46) as a backing and also with a projection 66 on the plunger 45, the arrangement being such that as the block 46 rotates carrying the plunger 45 with it, the thin edge of the wedge 62 enters between the surface 64 and the projection 66 and separates them, forcing the projection 66 to the left in Fig. 1 and thus positively operating the plunger to set the brake and release the clutch, at the end of a single revolution of the shaft.

While the wedge member 62 is automatically operated to release the clutch and set the brake, it is preferably, though not necessarily, under manual control in order that the operator may determine the time of operation of the machine of which this mechanism is a part by releasing the plunger 45 to the action of the stored up energy in the spring 56. Thus when the wedge 62 is removed from the position shown in Fig. 1, plunger 45 is urged to the right in said figure by the spring 56 simultaneously setting the clutch and releasing the brake, and initiating operation of the machine through the power shaft 28.

In the illustrative embodiment of the invention, the wedge 62 is at the free end of a lever 68 pivoted loosely upon a pivot 70 in the frame of the machine. Carried by the lever 68 is a latch member 72 pivoted at 74 on said lever and having at its upper end a catch plate 76 arranged to engage into a notch in a second latch plate 78 secured to a lever 80 mounted loosely on the pivot 70. Secured to the upper end of the latch member 72 is a spring 82 having its other end secured to a pin on the lever 68, the function of the spring being to hold the latch member 72 in such position that the latch plate 76 is engaged in the notch in the other latch plate 78. Preferably the latch member 72 has a tail portion 84 at its lower end which rests upon a peripheral portion of the block 46 and is arranged in position to be struck by a cam projection 86 (Fig. 2) on the block 46 to cause the unlatching of latch plates 76 and 78 for a purpose that will be hereinafter described.

Connected to the free end of the lever 68 is a spring 88, the other end of which is secured to any suitable stationary support, as for instance a stud 90, on the bearing 92 of the shaft 4. Pivoted to the end of the lever 80 is a rod 94, the upper end of which is connected to some manually operable means, as for instance a manually operable lever, by means of which the operator may initiate power operations of the machine in which the described mechanism is embodied. When the rod 94 is pulled upwardly through the actuation of the starting means, the lever 80 is turned upwardly about the pivot 70 and because of the engagement of latch plate 78 with latch plate 76, the lever 68, together with its wedge end portion 62 is carried upwardly, withdrawing the wedge from engagement with the plunger 45. The plunger is instantly moved to the right (Figs. 1 and 4) by the spring 56 setting the clutch and releasing the brake, the brake being released before the clutch becomes operative. Shortly after the shaft 28 is thus clutched to the continuously rotating wheel 26, the cam projection 86 strikes the tail 84 of the latch lever 72 and trips the latch lever so that it is released from engagement with the latch plate 78 on lever 80 with the result that the wedge lever 68 drops back under gravity and the pull of the spring 88 to a position in which the small end of the wedge 62 (Fig. 3) can engage between the projection 66 on the plunger 45 and the adjacent wall 64 and retract the plunger at the proper time against the action of the spring 56, said retraction of the plunger taking place at the termination of one revolution of the shaft. The operating mechanism just described is quite similar to a well known commercial form of the one revolution non-repeating clutch disclosed in Patent No. 1,011,903, granted December 19, 1911, on the application of Arthur Bates. A feature of construction that is distinctly novel so far as applicant is aware is found in the provision of means for holding the starting means up in starting position after it has been lifted to that position by the operator. In other words, if certain parts of the machine including the starting lever have been operated, in an organization in which the described clutch is embodied, the operator cannot change his mind, at least, he cannot stop the machine until the completion of the cycle. It will be noted that the plate 76 on the latch member 72 is received into a notch in the plate 78 on the lever 80 on which the starting rod 94 is pivoted and supported. Hence when the starting rod 94 is actuated by the operator to lift the wedge 62, the latter resting on the projection 66 of the plunger or on a peripheral portion of member 46, holds the lever 80 and starting rod 94 up through engagement of plate 76 in the notch of plate 78. Later the tail 84 of the latch member 72 is struck by the cam projection 86 thus releasing the plates from each other.

From the foregoing description it is thought that the mode of operation of the mechanism will be readily understood. It may be desirable, however, to point out certain features of the construction in order to emphasize the objects attained by the invention. It will be observed that upon removing the wedge 62 from contact with the plunger 45 the spring 56 operates automatically to move the plunger 45 in a direction to set the clutch within the chamber of the gear wheel 26 and simultaneously to release the clutch parts which constitute the brake within the chamber 31 in the stationary part of the frame 18, and hence the machine is started free from the retarding action of a brake whereas in many of the well known prior constructions the brake is still operative at the time the clutched shaft starts to rotate. Again, as the shaft approaches the end of one revolution, the wedge member 62 again engages the projection 66 on the plunger 45 and positively moves the plunger 45 to the left in Fig. 1, thus releasing the clutch within the chamber 30 of the gear wheel 26 and simultaneously setting the brake within the chamber 31 in the frame portion 18, and hence the shaft at the instant it is released from the continuously rotating member 26 is firmly clutched to a stationary part of the frame and prevented from further rotation. It will be clear, furthermore, that there is provided in the illustrative embodiment of the invention a clutch mechanism which is readily adaptable both for clutching a shaft to a power driven member and for clutching it to the stationary portion to prevent further movement and that an especially efficient and compact arrangement of the clutch and brake mechanisms is provided for use in machines where compactness and high efficiency and certainty in operation are essential.

Having thus described my invention, what I claim as new and desire to secure by Letters Patent of the United States is:

1. In a mechanism of the class described, a driving member, a driven member, a clutch expansible for connecting the driven member to the driving member, a contractible and expansible brake connected to the driven member, and means comprising a single member connecting the brake and the clutch and automatically operative to operate the clutch and release the brake in such timed relation that the brake is released before the clutch operates to connect the driving and driven members.

2. In a mechanism of the class described, a driving member having a chamber therein, a driven member upon which the driving member is rotatably mounted, a support for the driven member also provided with a chamber, expansible clutch and brake devices carried by the driven member and positioned respectively in the chamber of the driving member and of the support, and means for simultaneously setting the clutch and releasing the brake and vice versa whereby the driven member is alternately clutched to the driving member and to the support.

3. In a mechanism of the class described, a driving member having a chamber therein, a driven member upon which the driving member is rotatably mounted, a support for the driven member also having a chamber, annular members mounted in said chambers and expansible to engage firmly with the walls of the chambers, and a single means for simultaneously expanding one annular member and contracting the other whereby the driven member is alternately clutched to the driving member and to the support.

4. In a mechanism of the character described, a driving member, a driven member upon which the driving member is rotatably mounted, a support for the driven member, two expansible and contractible rings carried by the driven member, and a single member operatively connected to both rings for simultaneously expanding one ring and contracting the other and vice versa, so that the driven member is alternately clutched to the driving member and to the support.

5. In a mechanism of the character described, a driving member arranged to be power-operated to run continuously, a driven member, a stationary support for the driven member a plurality of expansible and contractible annular members carried by the driven member, and a single means for simultaneously expanding one annular member and contracting another whereby the driven member is alternately connected to the driving member and to the stationary support.

6. In a mechanism of the character described, a supporting frame, a shaft mounted in the frame for rotation therein, a driving member mounted rotatably on the shaft and having a chamber therein, said support also having a chamber surrounding the shaft, an expansible and contractible annular member of like construction mounted in each chamber in reversed relation to each other and connected to the shaft, and means movable in one direction for simultaneously expanding one annular member and contracting the other whereby the shaft is released from its support for free rotary movement therein before it is clutched to the driving member.

7. In a mechanism of the character described, a shaft, a supporting frame in which the shaft is mounted for rotation, a driving member rotatable with respect to the shaft and having a chamber therein, said support also having a chamber, an expansible and contractible annular member mounted in each chamber and secured to the shaft, a plunger operatively connected to each annular member, and means under the control of the operator for moving the plunger to cause expansion of the annular member in one chamber and simultaneously contraction of the other annular member.

8. In a machine of the class described, a shaft, a supporting frame on which the shaft is rotatably mounted, a driving member mounted for rotation with respect to the shaft and having a chamber therein, said supporting frame also having a chamber, a pair of expansible and contractible annular members mounted in said chambers and secured against rotary movement relatively to the shaft, means for simultaneously expanding one annular member and contracting the other comprising a cam member, and a manually operable member for actuating said cam.

9. In a mechanism of the character described, a shaft, a stationary supporting frame in which the shaft is rotatably mounted, a driving member mounted upon the shaft for rotation with respect thereto and having a chamber therein, said supporting frame also having a chamber which faces in the opposite direction from the first mentioned chamber, an expansible and contractible annular member mounted in each chamber, means for causing the annular members to rotate with the shaft, a plunger movable in a direction parallel with the shaft for simultaneously expanding one annular member and contracting the other whereby the shaft is alternately clutched to the driving member and to its support, and a manually operable member for controlling said plunger.

10. In a mechanism of the character described, a shaft, a stationary support in which the shaft is rotatably mounted, a driving member rotatably mounted on the shaft and having a chamber therein, said support having a chamber facing the first mentioned chamber, a pair of expansible and contractible annular members mounted in said chambers, a block keyed to the shaft and having projecting portions to engage with the annular members to cause rotation of the latter with the shaft, a plunger mounted in the block for movement in a direction parallel with the shaft and having connections with said annular members, a cam or wedge member for moving the plunger in one direction, and a spring for moving it in the other direction, and a manually operable member for moving said wedge member.

11. In a mechanism of the character described, a shaft, a support on which the shaft is rotatably mounted, a driving member mounted for rotation on the shaft and having a chamber therein, said support also having a chamber, a clutch mounted in the chamber of the driving member, a brake mounted in the chamber in the support, a single member for operating the brake and the clutch, a wedge member under control of the operator for operating said single member positively to apply the brake and release the clutch, and a spring for releasing the brake and applying the clutch.

12. In a mechanism of the class described, a driving member, a driven member rotatable in the frame of the machine, a clutch device operable to connect the driving and driven members, a brake device operable to connect the driven member with a surface on the frame of the machine, means for simultaneously applying the brake and releasing the clutch and vice versa and means for insuring proper operation of the clutch.

13. In a mechanism of the class described, a driving member, a driven member adapted to be operatively connected to the driving member, a support for the driven member provided with a chamber, a brake device carried by the driven member and positioned in the chamber of the support, a clutch device structurally distinct with respect to the brake device and arranged for operatively connecting the driving and driven members, and means for simultaneously setting the clutch and releasing the brake and vice versa whereby the driven member is alternately clutched to the driving member and to the support.

14. In a mechanism of the class described, a driving member, a driven member, a support for the driven member having a chamber, an annular member mounted in said chamber to move with the driven member and expansible to engage firmly with the wall of the chamber, a clutch for operatively connecting the driving and driven members, and a single means for simultaneously operating the annular member and the clutch in such manner that the driven member is alternately clutched to the driving member and to the support.

15. In a mechanism of the character described, a driving member, a driven member, a support for the driven member, two expansible and contractible rings carried by the driven member and arranged to engage surfaces on the driving member and on the support, respectively, and means for simultaneously expanding one ring and contracting the other in such manner that the driven member is released from the support as it is being clutched to the driving member.

16. In a mechanism of the character described, a shaft, a stationary supporting frame in which the shaft is rotatably mounted, a driving member mounted upon the shaft for rotation with respect thereto, a clutch between the shaft and the driving member, said supporting frame having a chamber therein, an annular expansible and contractible member mounted in said chamber, means for causing the annular member to rotate with the shaft, and a plunger movable in a direction parallel with the shaft for simultaneously operating said annular member and said clutch, whereby the shaft is alternately clutched to the driving member and to its support.

17. In a mechanism of the character described, a shaft, a stationary support in which the shaft is rotatably mounted, a driving member rotatably mounted on the shaft and having a chamber therein, said support having a chamber facing the first mentioned chamber, an expansible and contractible ring member mounted in the chamber in the support, a block keyed to the shaft and having a projecting portion to engage with the ring member to cause rotation of the latter with the shaft, a clutch mounted in the other chamber operative to connect the shaft and the driving member, a plunger mounted in the block for movement in a direction parallel with the shaft and having connections with said ring member and clutch, a cam or wedge member for moving the plunger in one direction, a spring for moving it in the other direction, and a cam for positively operating the plunger in the direction that it is moved by the spring.

18. In a mechanism of the character described, a shaft, a support on which the shaft is rotatably mounted, a driving member mounted for rotation on the shaft and having a chamber therein, said support also having a chamber, two expansible and contractible annular members, mounted in the chamber of the driving member and in the chamber in the support in reversed relation to each other so that movement of a connecting member in one direction has an opposite effect on the two annular members, and a single member for connecting and operating the two annular members.

19. In a mechanism of the character described, a driving member arranged to be power-operated to run continuously, a driven member, a stationary support for the driven member, a pair of expansible and contractible annular members carried by the driven member, and power means automatically operative for simultaneously expanding one ring and contracting the other and vice versa, whereby the driven member is alternately connected to the driving member and to the stationary support.

20. In a mechanism of the character described, a fixed supporting frame, a shaft mounted in the frame for rotation therein, said supporting frame having a chamber surrounding the shaft, an expansible and contractible annular member mounted in said chamber and connected to the shaft, means for expanding the annular member to connect the shaft to the stationary support comprising a screw threaded into the member, means to turn the screw comprising a spring-pressed plunger, and means automatically moved to engage the plunger to move it positively to operative position as the shaft completes one revolution.

21. In a mechanism of the character described, a shaft, a fixed supporting frame in which the shaft is mounted for rotation, said supporting frame having a chamber, an expansible and contractible annular member mounted in said chamber and secured to the shaft, means for expanding the annular member comprising a screw threaded into the member, means to turn the screw comprising a plunger arranged to revolve about the axis of the shaft, a projection on the plunger, and a wedge automatically brought into engagement with the projection and constructed to move the plunger positively into operative position as it completes one revolution.

22. In a mechanism of the class described, a driving member, a driven member rotatable in the frame of the machine, a clutch for connecting the driven and driving members, a brake device operative to connect the driven member with a friction surface on said frame, and a wedge member under the control of the operator and automatically operative to actuate the brake device positively into operative relation with said friction surface at the end of the rotation of the driven member.

23. In a mechanism of the class described, a driving member, a driven member rotatable in the frame of the machine, clutch and brake devices carried by the driven member and arranged to co-operate respectively with the driving member and with a surface on the frame of the machine, and automatically operating means, comprising positively operating cam members, for simultaneously applying the brake and releasing the clutch and vice versa.

24. In a mechanism of the class described, a driving member, a driven member, a stationary support, expansible and contractible annular means for alternately connecting the driving member to the stationary support and to the driven member, and means comprising a spring-operated plunger for controlling the said annular means.

25. In a mechanism of the class described, a driving member, a driven member, a stationary support, expansible and contractible annular means whereby the driven member is alternately connected to the driving member and to the stationary support, and a manually controlled plunger for determining the position of the annular means.

26. In a mechanism of the class described, a shaft, a driving member, a driven member, a stationary support, expansible and contractible annular means whereby the driven member is alternately connected to the driving member and to the stationary support, a plunger parallel with the shaft and movable for determining the position of the annular means, and a manually operable member for controlling said plunger.

27. In a mechanism of the class described, a driving member, a driven member, a stationary support, expansible and contractible annular means whereby the driven member is alternately connected to the driving member and to the stationary support, a plunger for determining the position of the annular means, and an arcuate cam for holding the plunger to give increased driving friction between the annular means and driving member.

28. In a mechanism of the class described, a driving member, a driven member, a stationary support, expansible and contractible annular means whereby the driven member is alternately connected to the driving member and to the stationary support, a plunger for determining the position of the annular means, and a wedge member to actuate the annular means positively into position to engage the stationary support and stop the rotation of the driven member.

In testimony whereof I have signed my name to this specification.

FRED ASHWORTH.